(12) United States Patent
Barlow

(10) Patent No.: US 6,209,846 B1
(45) Date of Patent: Apr. 3, 2001

(54) COMPUTER MONITOR HOUSING

(76) Inventor: Randolph E. Barlow, 12929 Oak Lawn Pl., Herndon, VA (US) 20171

( * ) Notice: Subject to any disclaimer, the term of this patent is extended or adjusted under 35 U.S.C. 154(b) by 0 days.

(21) Appl. No.: 09/454,771

(22) Filed: Dec. 3, 1999

(51) Int. Cl.⁷ .............................. H05K 5/00; H05K 7/00; A47B 81/00; A47F 7/14
(52) U.S. Cl. ......................... 248/917; 361/681; 361/682; 361/683; 361/686; 248/915; 248/916; 248/918; 312/223.1; 312/223.2
(58) Field of Search ..................... 361/681, 682, 361/683, 686; 248/915, 916, 917, 918; 312/223.1, 223.2

(56) References Cited

U.S. PATENT DOCUMENTS

| 4,714,351 | * | 12/1987 | Domen | 361/17 |
|---|---|---|---|---|
| 5,332,221 | * | 7/1994 | Reed | 273/153 |
| 5,337,540 | * | 8/1994 | Carroll | 53/459 |
| 5,825,537 | * | 10/1998 | Ushiyama | 359/408 |
| 5,893,789 | * | 4/1999 | Wu | 446/129 |
| 5,978,211 | * | 11/1999 | Hong | 361/683 |

* cited by examiner

Primary Examiner—Leo P. Picard
Assistant Examiner—Tung Minh Bui

(57) ABSTRACT

A computer monitor housing comprising first and second hemispherical shells having sizes such that one of the shells can nest substantially completely inside the other, a video display panel supported within the first shell, a supporting pedestal secured to the first shell, a powered drive for pivotally moving the first and second shells about a substantially horizontal diametrical axis in such a manner that the shells are relatively movable between a closed position in which the shells are positioned with their concave sides facing so as to conceal the video display panel and an open position in which the shells are nested one inside the other for revealing the video display panel.

15 Claims, 3 Drawing Sheets

COMPUTER MONITOR HOUSING

This invention relates to a computer monitor housing. More particularly the invention relates to a computer monitor housing which has an aesthetic appeal distinct from the appearance of a conventional monitor, and which is capable of concealing the monitor when not in use.

BACKGROUND AND OBJECTS OF THE INVENTION

Computer monitors have become extremely common items in offices, workspaces, retail stores, automobile service facilities, airports, and anywhere a computer is used. The monitors generally sit on desks, tables, stands, counters and the like. But regardless of where such monitors are located, they have a very familiar shape and appearance, and are immediately recognized as a computer monitor, largely because of their shape or appearance. Although the computer industry has exploded with technology in the latter part of the twentieth century, the shape and appearance of computer monitors has changed little. Monitors have even grown, from the thirteen inch monitors so common in the 1980's, to the 17, 19 and 21 inch monitors presently.

Prior art monitors generally are rather heavy and have a large, bulky and familiar shape, with a generally rectangular appearance from the front, tapering in all directions toward the rear, and supported on a pedestal. The screen of course is located on the rectangular front, often includes knobs or controls for the monitor.

More recently, some attention has been directed at monitors to create a more aesthetic appearance with corresponding appeal. For example, U.S. Design Pat. No. 413,105 discloses a horizontal teardrop shape, with rounded corners and concealed front controls. This housing has been marketed in colors to again increase the aesthetic appeal.

Another approach has been taken in Design U.S. Pat. No. 390,218 wherein speakers are mounted in wings hingedly attached to the sides of the monitor and are pivotal to the front to conceal the monitor and speakers when closed.

U.S. Pat. Nos. 4,766,422 and 4,735,467 discloses other ways to conceal the computer monitor by mounting it on a support which is retractable into the desk when not in use. This patent uses a flat screen display, much like the displays used in laptop computers, in order to facilitate the support and concealment of the display.

Most of the prior attempts to change the appearance of the monitor have still produced shapes which are largely dictated by the shape of the cathode ray tube which forms the bulk of the actual monitor. Although changes in such tubes have reduced the length of the tube, they still have the familiar elongated shape, which is not particularly aesthetic, and which is bulky and dominant on a desktop, and has little appeal apart from its function.

Accordingly the primary object of present invention is to provide a monitor housing which is capable of significant and distinctive aesthetic appeal.

Another object of the invention is to provide a monitor housing which conceals the function of the monitor when not in use.

A further object of the invention is to provide a monitor housing which is convertible from an aesthetic object to a functional computer monitor.

Still another object of this invention is to provide a monitor housing which may be ornamented to simulate a variety of objects with different appeal.

Yet another object of the invention is to provide a monitor housing which interacts with the computer power saving features so as to conceal the monitor when the computer is in a power saving mode.

Still a further object of the invention is to provide a monitor housing which may be of different shapes to simulate different objects.

DESCRIPTION OF THE INVENTION

The present invention takes advantage of flat screen technology for a so-called "desktop" monitor in order to benefit from the size advantages of flat screen displays. Although the invention could be used with cathode ray tube type video displays, the size of such displays is one of their biggest drawbacks, and the flat screen displays are preferred. The monitor housing of this invention comprises at least two shells which are pivotally connected together along a midline. The shells are relatively pivotable from a position in which they are nested one inside the other, to a position in which they overlap at their edges to form a shape which simulates a unique object. For example, the object may be a sports ball such as a golf ball, a basket ball, a soccer ball, a football, or the like.

When the shells are pivoted to a first or open position in which they are nested, the video display terminal is visible for use as a computer display. But, when the shells are relatively pivoted to a second or closed position, the video display screen is hidden from view. By suitably ornamenting the exterior of shells, the housing can be made to resemble a golf ball, a soccer ball, a globe or the like. A mirror finish may also be provided. Likewise, the housing may be elongated in an egg-shape and ornamented to resemble a football, while still concealing the video display screen.

The half shells may simply be pivotally connected so that one of the shells is mounted on a base or pedestal and the other is pivotally attached to the first. A handle may be provided if desired to facilitate manually moving the pivotal shell between the open and closed positions.

In another embodiment, a servo-motor is connected to the movable shell to move that shell between the open and closed positions. Preferable, the motor is provided with a connection to the computer, so that when the display screen is energized, the motor is activated to pivot the shell to the first position and thereby open the housing for use. Similarly, when the video display is powered down, the servo-motor is reversed to close the housing. A variety of different drive connections can be provided between the servo-motor and the movable shell.

By virtue of this invention, a variety of monitors can be provided differing by ornamental rather than functional considerations.

DESCRIPTION OF THE DRAWINGS

The invention will now be described in greater detail with reference to the accompanying drawings which show, by way of non-limiting example, a preferred embodiment of the invention, in which.

DETAILED DESCRIPTION OF THE INVENTION

Figure 1:
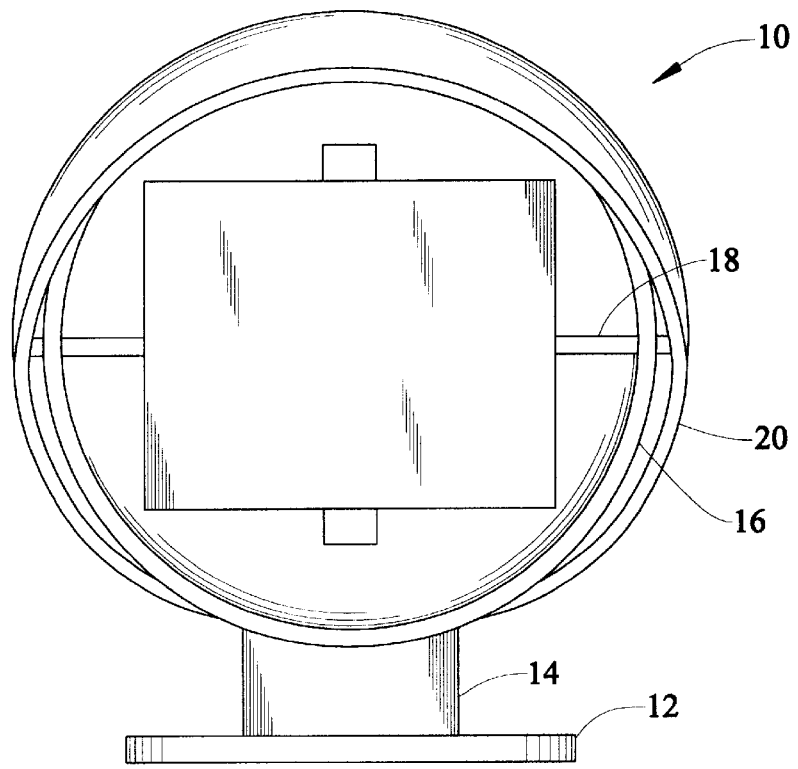
FIG. 1 is a front schematic view of the monitor housing in the open position such that the video display screen is visible.

Referring to FIG. 1 of the drawings, the monitor housing generally designated 10 is seen to include a supporting base 12 and an upstanding pedestal 14 which supports a first, inner shell 16. As shown, the inner shell 16 is a generally hemispherical shell which can be formed of any suitable material, depending largely upon the appearance desired in the finished product. For example, a molded plastic shell can be used and ornamented in a variety of ways. Alternatively, a polished metal shell can be provided with, for example, a mirror finish, or a brushed finish, to create differing aesthetic appeal.

Figure 2:
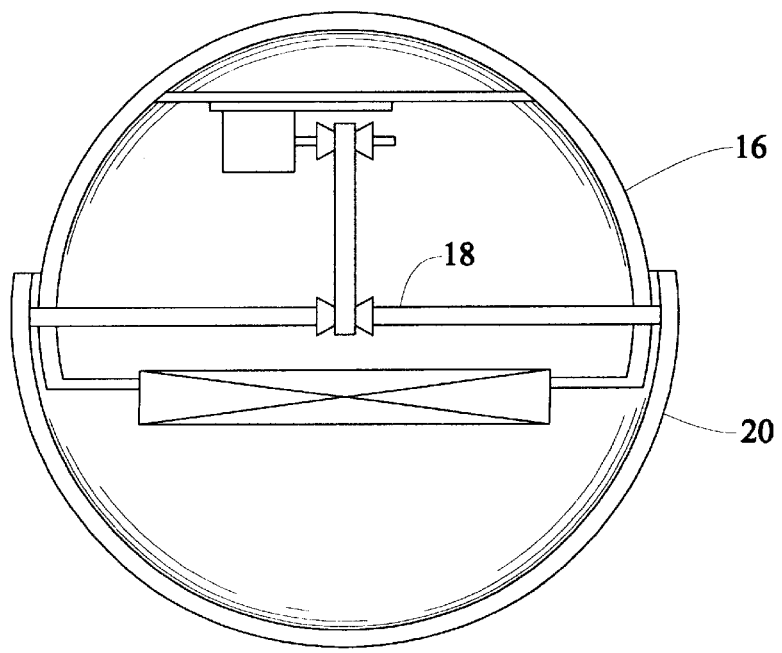
FIG. 2 is a horizontal cross-sectional schematic view of the monitor housing in the closed position.
Figure 3:
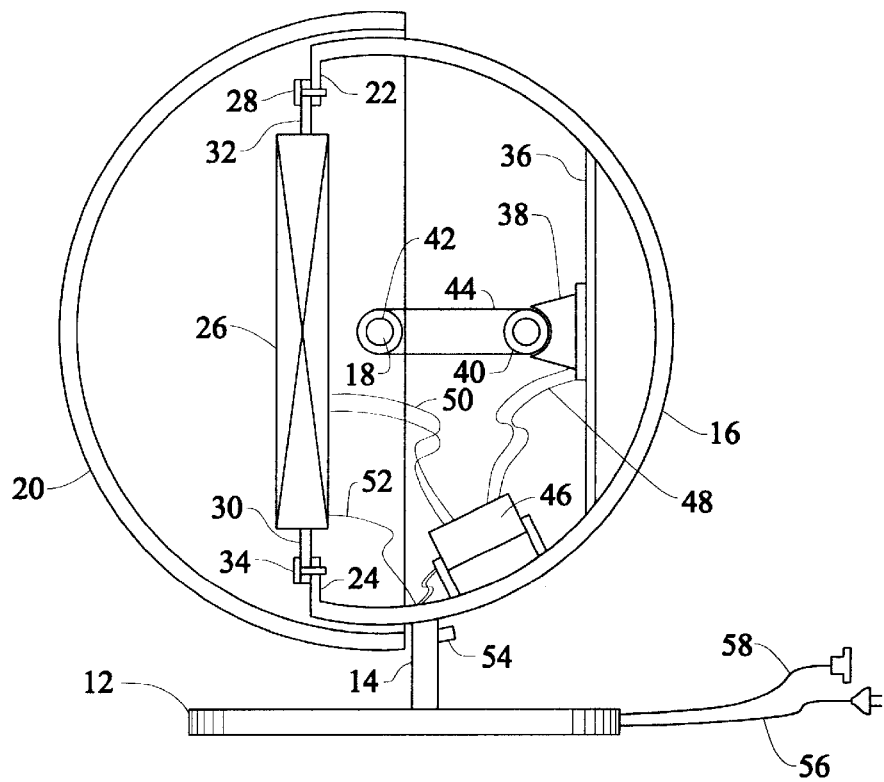
FIG. 3 is a vertical cross-sectional schematic view of the monitor housing in the closed position.
Figure 4:
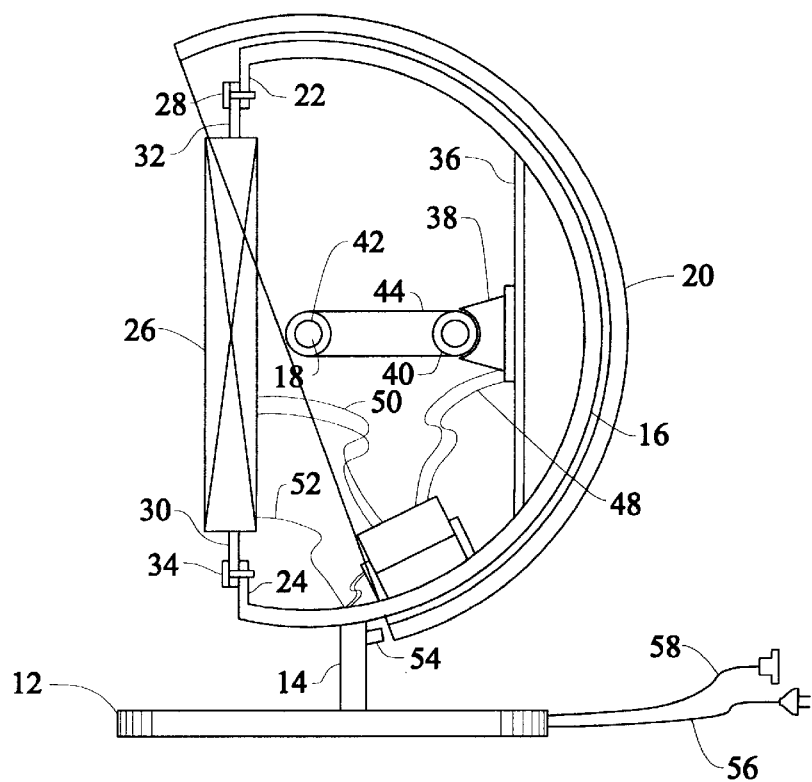
FIG. 4 is a vertical cross-sectional schematic view of the monitor housing in the open position.

A pivot axle 18 is journalled through the shell 16, and secured to a second, outer shell 20 at its ends. In this manner, the axle 18 may rotate freely with respect to the inner shell 16, but rotates with the outer shell 20. The outer shell 20 has a slightly greater diameter than the inner shell 16. In this manner, the outer shell 20 may pivotally rotate about the pivot axle 18, between a first, open or nested position as shown in FIGS. 1 and 4, and a second, closed position as shown in FIGS. 2 and 3. When in the open position, the outer shell 20 pivots around or behind the inner shell 16 as best seen in FIG. 4. In this position, the interior of the inner shell 16 is visible from the front as seen in FIG. 1, while the rear of the inner shell 16 is concealed by the outer shell 20.

A pair of brackets 22, 24 securely extend from diametrically opposite top and bottom points on the interior of the inner shell 16 as shown in FIGS. 3 and 4. A video display panel 26 has a pair of brackets 28, 30 securely extending from the top and bottom sides thereof in proximity to and overlapping the brackets 22, 24. A pair of threaded fasteners such as thumb screws 32, 34 are used to secure the video display panel 26 and the brackets 28, 30 to the brackets 22, 24, and thus to the inner shell 16.

On the inner rear wall of the inner shell 16, a support bracket 36 is provided. This support bracket 36 may be used to mount a drive mechanism for moving the outer shell 20, as will be explained. A reversible drive motor 38 is mounted on the bracket 36 behind the video display panel 26, and concealed by the panel 26. The drive motor 38 has a drive pulley 40 on its output shaft. Mounted on and secured to the pivot axle 18 is a driven pulley 42, and a suitable drive belt 44 connects the pulleys 40, 42 such that when the motor 38 is actuated, the drive connection represented by the pulley 40, belt 44 and pulley 42 cause the pivot axle 18 to rotate, in turn causing the outer shell 20 to move between the closed position seen in FIG. 3 and the open or nested position seen in FIG. 4. In the open position, the video display panel 26 is visible to the user in front of the monitor housing.

Also mounted on the interior of the inner shell 16 is a transformer 46 which provides power to the motor 38 through a suitable cable 48, and to the video display panel 26 through a second cable 50. The cable 50 may also include signal connections for the display, or a different signal cable 52 may be used for this purpose. In one embodiment, a limit switch 54 is provided on the pedestal 14 and positioned so as to be contacted by the outer shell 20 as it is being pivoted to the open position. In this embodiment, the limit switch 54 serves to interrupt the current to the drive motor 38 and thus stop the motor when the outer shell reaches the limit of its travel. In one embodiment, the power connection is controlled by the energy saving functions of the computer to which the display is connected, so that when the computer itself is in the "sleep" mode, the monitor housing is in the closed position as shown in FIGS. 2 and 3, and when the computer is returned to the active state, the outer shell is activated with the display panel to move the outer shell 20 to the open or nested position.

External cabling connections for both the power connections and the video signals can be provided by means of cables 56 and 58 respectively extending from the base to a computer (not shown).

If desired, a filler panel may be provided between the video display panel 26 and the surrounding inner shell 16, such that the motor 38, transformer 46, cables 48, 50, 52, brackets 22, 24, 28, 30, and the like are all concealed behind the display panel. Similarly, the function of the brackets 22, 24, 28 and 30 can be integrated into the filler panel for mounting the display panel 26 within the shell, in such a manner that the drive mechanism, electrical connections and mounting structure are concealed.

Similarly, although a simply motor and pulley arrangement has been shown for the driving mechanism for the outer shell, clearly this could be replaced by a suitable gear drive for causing the pivoting of the outer shell 20 in the manner indicated. Moreover, while two complementary shells are shown in the drawings, clearly three or more such shells could be used and nested in the same manner. A different number of nesting shells may provide a higher level of appeal when different ornamentation is utilized.

Figure 5:
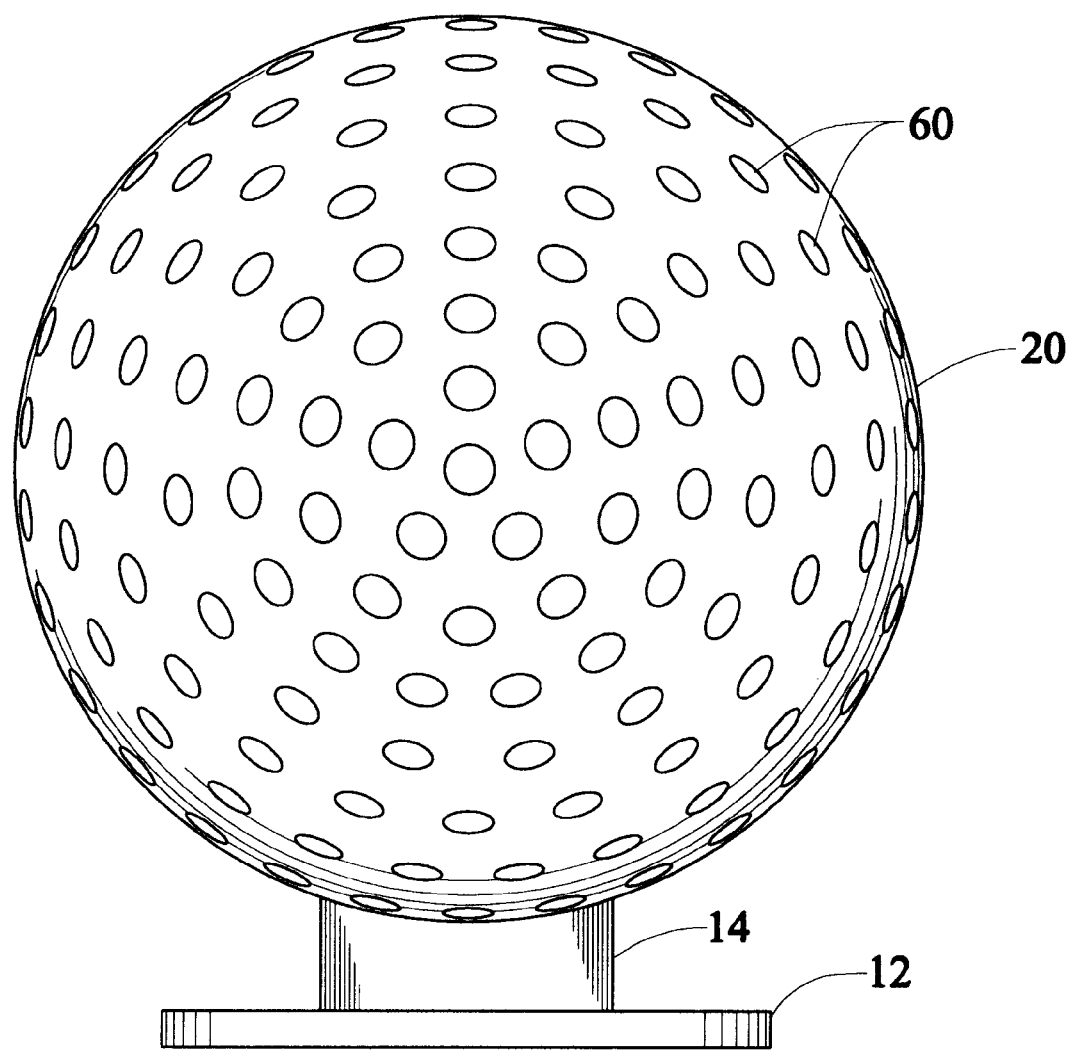
FIG. 5 is a plan view of the monitor housing in the closed position and ornamented to resemble a golf ball.

Referring to FIG. 5, the front of the monitor housing is shown ornamented to resemble a large golf ball. The base 12 and pedestal 14 are shown, and the outer shell 20 is shown to have a plurality of dimples 60 resembling the dimples on a golf ball. These dimples can be printed onto the surface, or may be molded into the surface, depending on the level of ornamentation and reality desired. Of course the exterior of the shells could be ornamented to resemble a great many different objects, or for novelty appearances or decorative purposes. According to the present invention, the appearance of the computer monitor is no longer governed by function, but may now be a product with aesthetic appeal.

While this invention has been described as having certain preferred features and embodiments, it will be understood that it is capable of still further variation and modification without departing from the spirit of the invention, and this application is intended to cover any and all variations, modifications and adaptations of the invention as may fall within the spirit of the invention and the scope of the appended claims.

I claim:

1. A computer monitor housing comprising a video display panel, at least two shells having a complementary shape such that one of the shells can nest inside the other, a supporting base, means for pivotally connecting said shells about a pivot axis in such a manner that said shells are relatively movable between a closed position in which said shells cooperate to conceal said video display panel and an open position in which said shells are nested one inside the other for revealing said video display panel.

2. A computer monitor housing as in claim 1 and wherein one of said shells is fixedly mounted on said supporting base and the other of said shells is movable relative to said one of said shells.

3. A computer monitor housing as in claim 2 and wherein said other of said shells is pivotally mounted with respect to said one of said shells, and including drive means for pivotally moving said other of said shells between said open and closed positions.

4. A computer monitor housing as in claim 3 and including means for connection said drive means to said computer for actuation in response to a signal from said computer for moving said other of said shells relative to said one of said shells.

5. A computer monitor housing as in claim 3 and wherein said shells each comprise a substantially hemispherical shell.

6. A computer monitor housing as in claim 5 and wherein each of said shells includes ornamentation on the exterior thereof so as to resemble a sports ball.

7. A computer monitor housing as in claim 5 and wherein said drive means comprises an electric motor and a drive connection between said electric motor and said other of said shells.

8. A computer monitor housing as in claim 5 and wherein said display panel is rectangular, and said housing includes a filler panel in the space surrounding said display panel and between said display panel and said housing.

9. A computer monitor housing as in claim 7 and wherein said other of said shells is secured on a pivot axle for rotation therewith, and said pivot axle is journaled through said one of said shells, said drive connection comprising a drive belt connection between said electric motor and said pivot axle.

10. A computer monitor housing as in claim 7 and including a limit switch for interrupting the current to said electric motor when said other of said shells is fully nested in said one of said shells.

11. A computer monitor housing comprising first and second hemispherical shells having sizes such that one of the shells can nest substantially completely inside the other, a video display panel supported within said first shell, a supporting pedestal means secured to said first shell, means for pivotally connecting said first and second shells about a substantially horizontal diametrical axis in such a manner that said shells are relatively movable between a closed position in which said shells are positioned with their concave sides facing so as to conceal said video display panel and an open position in which said shells are nested one inside the other for revealing said video display panel.

12. A computer monitor housing as in claim 11 and including drive means for pivotally moving said second shell relative to said first shell and thereby relatively moving said shells between said open and closed positions.

13. A computer monitor housing as in claim 11 and wherein the exterior surfaces of said first and second shells are ornamented so as to resemble a sports ball.

14. A computer monitor housing as in claim 11 and wherein the exterior surfaces of said first and second shells are ornamented so as to resemble a golf ball.

15. A computer monitor housing as in claim 12 and including means for connecting said drive means to a computer for controlling the operation of said drive means in response to startup commands generated by said computer as a result of power-up and power-down functions.

* * * * *